Fig. 1.

July 26, 1960 F. D. DE VANEY ET AL 2,946,469
HEAT-TREATING FLUENT SOLIDS
Filed May 13, 1957 8 Sheets-Sheet 2

INVENTORS
Fred D. DeVaney
Donald Beggs
BY Pierce, Scheffler & Parker
ATTORNEYS

F. D. DE VANEY ET AL 2,946,469

HEAT-TREATING FLUENT SOLIDS

Filed May 13, 1957

INVENTORS
Fred D. DeVaney and
Donald Beggs,
BY Pierce Scheffler & Parker
their ATTORNEYS

United States Patent Office 2,946,469
Patented July 26, 1960

2,946,469
HEAT-TREATING FLUENT SOLIDS

Fred D. De Vaney, Duluth, Minn., and Donald Beggs, Toledo, Ohio, assignors to Erie Mining Company, Hibbing, Minn., a corporation of Minnesota Filed May 13, 1957, Ser. No. 658,580

2 Claims. (Cl. 214—18.2)

The present invention relates to apparatus for continuously laying down fluent small masses, e.g., pellets, of mineral particles, e.g., ore concentrates or fines, onto the stockline of a gravitationally descending charge column within a shaft furnace, wherein the small masses constituting the charge are subjected to a desired heat treatment. The invention is particularly concerned with the provision of improvements in the control of a loader mechanism for continuously laying down relatively fragile pellets of moist mineral particles in a manner automatically to compensate for irregularities in the profile of the stockline, arising from irregularities in the rate of feed to the column and from uneven descent of the column, and to maintain a substantially uniform stockline. The improved control mechanism is applicable generally to furnace loaders which continuously travel over the stockline of the charge either in a rotary manner in the case of a shaft furnace of generally circular cross-section or in a pattern of rectilinear movements in the case of a shaft furnace of generally rectangular cross-section, and will be described, in the following, with reference to both types of loaders for pellet-indurating shaft furnaces. It is to be noted, however, that the improvements of the present invention are applicable to any type of shaft furnace, whether used for pellet-indurating or for some other heating or metallurgical operation, wherein it is desirable or necessary to maintain a uniform stockline without mechanical rabbling.

In most shaft-type furnaces or chambers where a fluent solid material is charged into the top and discharged from the bottom, the stockline profile obtained depends in most part either on the angle of repose of the material or the functioning of some mechanical leveling device such as a rabbling arm. In the art of indurating pellets of balled-up moist particles of mineral solids such as iron ore concentrates neither of the above means can be used because (1) the irregularity of profile represented by an angle of repose amounts to too great a variation in the length of travel of the countercurrent stream of heat-treating gas and (2) mechanical rabbling would break up the relatively very feeble or fragile pellets or balls. Thus, in charging such pellets to the indurating furnace the same must be dropped—for only a minimum distance—onto the stockline and thereafter not disturbed. The stockline of the pellet-indurating furnace must be relatively uniform for two reasons:

(1) The distance that the pellets are dropped from the loader must be maintained at a minimum in order to avoid breakage from excessive impact, and (2) The velocity of gases leaving the stockline must be as uniform as possible over the entire surface, which precludes hills and valleys of any substantial magnitude. With hills and valleys the gas velocity would be greater at the valley than at the peak of the hill. This uniformity of gas flow must be maintained in order to maintain uniform drying and heat treating of the pellets.

The problem of maintaining the stockline uniform in an indurating furnace in which the fluent material is merely dropped onto the stockline and left undisturbed (i.e., not rabbled) deserves consideration and discussion. First assume that the stockline rate of descent is absolutely uniform over the entire surface: now, if the loader deposits 1% more feed continuously in a first area than in a second area, the first area will in time build up to a ridge with a valley at the second area. In other words, no continuously recurring error in feed can be tolerated, even of small magnitude. Conversely, with an absolute uniformity in feed distribution, no continuous differential in rate of descent of the stockline can be tolerated, in spite of which it is the fact that in the operation of such shaft-type furnace, irregularities in the rate of descent invariably occur. From a practical point of view, when dealing with commercial size shaft furnaces, the following is true:

(a) Any mechanical feeding mechanism will have some error in uniformity of distribution, where material is simply dropped onto the stockline, and (b) The stockline descent will always be subject to irregularities.

Thus, with no means for correction, the stockline cannot be maintained desirably uniform.

The expression "substantially uniform stockline" as used above is intended to describe not only a charge column top surface which lies substantially in a single horizontal plane but also a charge column top surface which is intended to present, in cross-section, any other predetermined contour. Thus, said expression is specifically intended to apply to a "dimpled stockline," i.e., to a charge column top surface which, in cross-section, is characterized by two similar downwardly converging, merging, convexly arcuate lines. Such "dimpled" contour is or may be desired in situations where the countercurrent of heating gas is in its entirety introduced into the charge column about the periphery of the latter and at a level a considerable distance below the stockline, and it is desirable or necessary that the flow of the heating gas be as uniform as possible throughout the upper part of the column. In such instances, the contour is dimpled so that the straight line distances from a peripheral gas inlet point to all points on the stockline on the same side of the major vertical axis of the charge column as said inlet point are substantially the same, thereby providing equal back pressures throughout the upper part of the column.

The general object of the present invention is to provide automatic means for maintaining a substantially uniform stockline by providing correction in accordance with deviations from a normal in order to maintain the deviations at a minimum.

According to the present invention, the novel means for maintaining uniformity of the stockline comprises, in association with the traveling loader mechanism of the shaft furnace, a control means responsive to a change in the profile of the stockline for varying the rate of deposit of fluent material by the loader mechanism inversely as the change in elevation of the profile to effect an increase in deposit rate at valleys along said path and a decrease in deposit at hills along said path. In its preferred embodiment, the invention comprises, in association with the shaft furnace a loader mechanism for depositing the fluent material onto the stockline of the charge column, means for moving said loader mechanism over the stockline along a predetermined path of deposit at a variable rate of movement, means movable with said loader mechanism over said path for determining the stockline profile, and means controlled by said stockline profile-determining means for automatically increasing the rate of movement of said loader mechanism when the latter is over a hill in said stockline profile and conversely decreasing the said rate of movement when said loader mechanism is over a valley in said stockline profile. As will be appreciated, when the rate of movement of the loader mechanism is increased (above "normal") the thickness of the layer deposited is thinner than normal, while when the rate of movement is decreased the thickness of the layer is thicker than normal.

The following comprise the basic elements of the apparatus involved:

(1) "Shaft" furnace into which material is charged at the top and discharged from the bottom;
(2) "Loader" or "feeder" for depositing fluent material onto the stockline;
(3) "Conveyor" for conveying material to the feeder;
(4) "Carriage" for carrying the loader over its feed path;
(5) "Carriage drive" for moving the carriage;
(6) "Discharge mechanism" for discharging material from the furnace;
(7) "Discharge mechanism drive" for actuating the discharge mechanism;
(8) "Profile-determining means" for gauging stockline elevation adjacent to the point of deposit of the loader in its path of travel; and
(9) "Carriage drive control" responsive to the profile-determining means to maintain constant profile of stockline.

In its preferred form, the apparatus also includes a (10) "Discharge control" responsive to said profile-determining means to maintain "average" stockline elevation.

In essence, the functioning of the improved apparatus organization is as follows: the average elevation of the stockline of the charge column is maintained within predetermined "normal" limits preferably by appropriate adjustment of the discharge rate, and actual profile irregularities in the stockline are reduced to a minimum by (a) gauging any low or high area adjacent to the point of deposit of material from the loader mechanism and (b) automatically reducing or increasing, respectively, the rate of movement of the loader carriage in passage of the loader over said area.

The invention will now be described with greater particularity with reference to the accompanying drawings, in which

Fig. 6 is also a plan view, more in detail, showing the arrangement of the motors, speed reducers, etc., mounted on the longitudinal carriage and a portion of the transverse, or "index" carriage and conveyor belt structure, the longitudinal belt and support therefor being omitted;

With reference now to the drawings:

Figure 1:
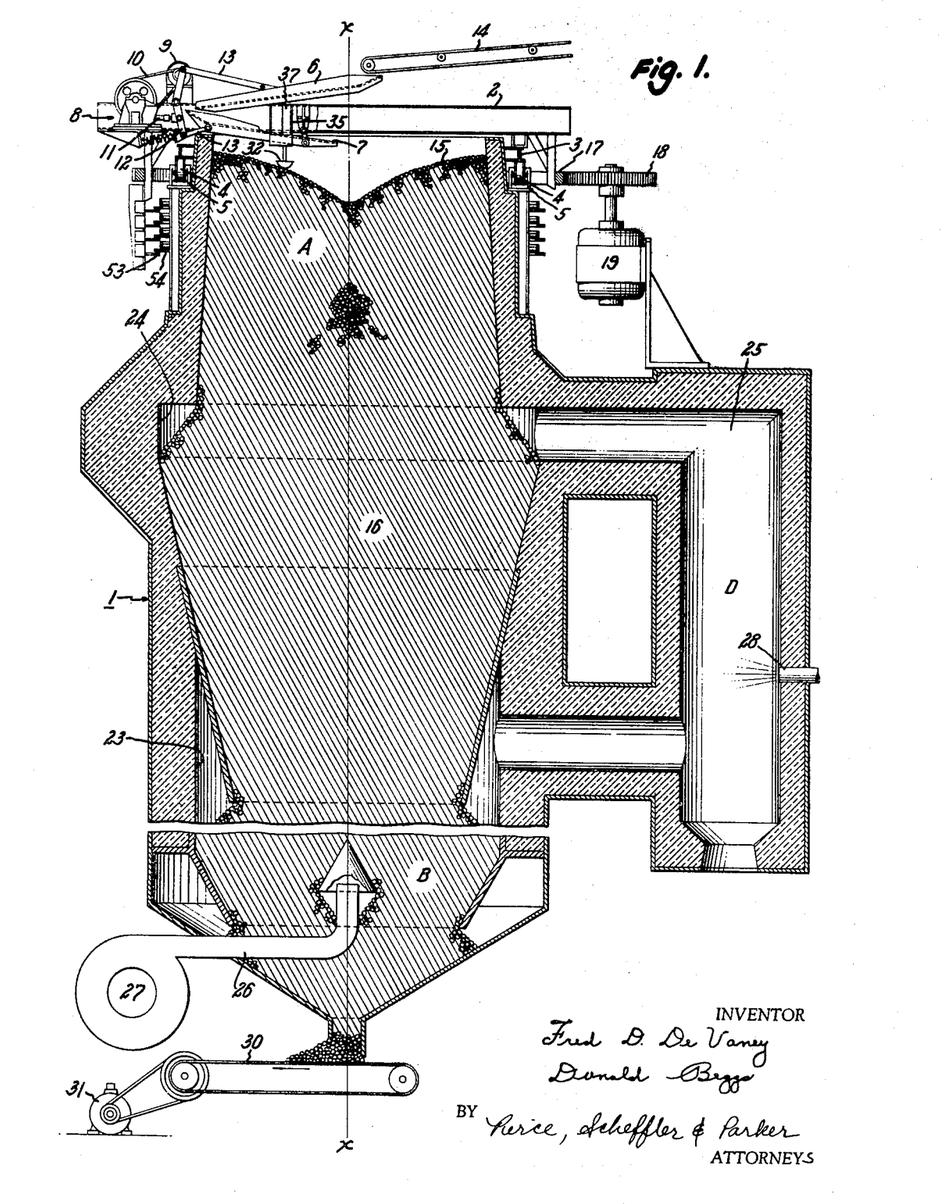
Fig. 1 is a view in vertical section of an indurating furnace of generally cylindrical construction having a rotatable carriage and loader supported thereby and in which is incorporated one embodiment of the invention.

In Fig. 1, a generally cylindrical and vertical, heat-insulated shaft furnace is represented in cross-section at 1. For charging this cylindrical type of furnace, a rotary type of loader or feeder is utilized. The principal components of this loader comprise a horizontal frame or carriage 2 made of structural iron having depending therefrom a circular trackway 3 supported by a plurality of rollers 4 journalled in bearing brackets 5 secured in spaced relation around the furnace on a horizontal offset portion of the furnace wall just below the furnace mouth. The center of trackway 3 is concentric with the vertical axis $x—x$ of the furnace and hence carriage 2 is revolvable about the furnace axis. Mounted upon the carriage at one side of the furnace axis $x—x$ is a reciprocating type of conveyor consisting of an upper chute 6 and a lower chute 7 connected to a "Diester" type of reciprocating drive designated generally by reference numeral 8. This type of drive obtains its power from an electric motor 9 by a belt and wheel 10 and the rotary input motion is converted into a reciprocating output motion of rod 11 which is coupled by lever 12 and linkage 13 to the upper and lower chutes 6 and 7 in such manner that the chutes reciprocate simultaneously in opposite directions. Chutes 6 and 7 are arranged one above the other in a direction generally radial of the furnace axis $x—x$. With the Diester type drive and the chute interlinked as shown, the radially outward stroke of chute 6 and the simultaneous radially inward stroke of chute 7 will be relatively rapid and the reverse strokes will be relatively slow. Hence, as the chutes reciprocate, fluent solid materials carried to the furnace by an endless conveyor belt 14 and dropped onto the inner end of chute 6 will be caused to travel radially outward to the outer end thereof. The material is then transferred to the outer end of lower chute 7 and caused to travel radially inward and spill off the side edges thereof onto the stockline 15 of a charge column 16 of similar materials generally filling the furnace.

Figure 2:
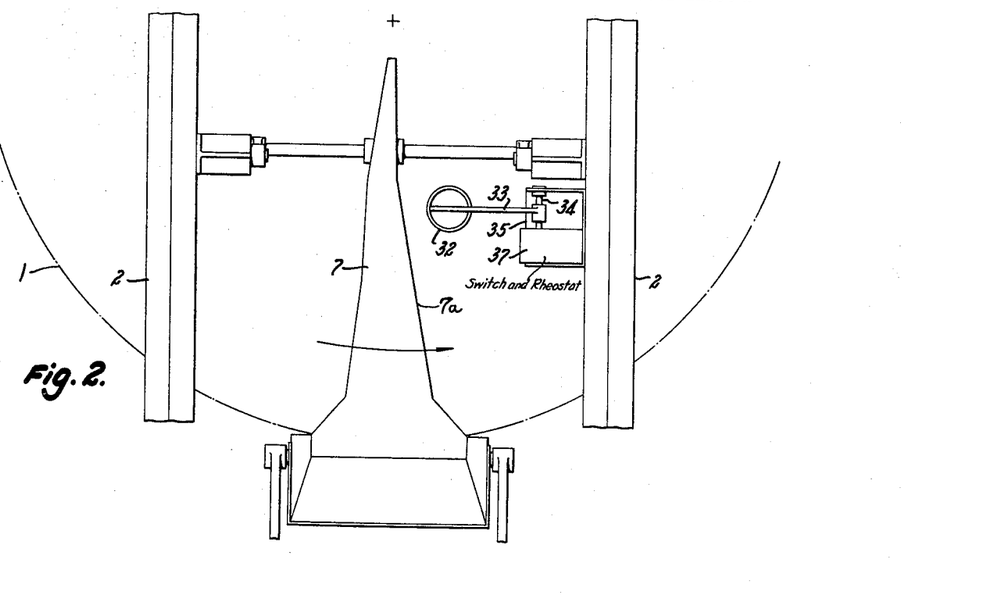
Fig. 2 is a view of the furnace of Fig. 1 in part top plan illustrating the essential features of the loader carriage control.

The upper chute 6 is substantially uniform in width throughout its length and serves to collocate the material. The lower chute 7 is, however, stepped downwardly in width in the radially inward direction as seen in Fig. 2 in order to distribute the material uniformly over the stockline as the carriage 2 rotates. For rotating carriage 2, the latter is provided with a depending ring gear 17 meshed with the gear 18 on the drive shaft of motor 19.

From a metallurgical point of view, furnace 1 corresponds generally to that disclosed in U.S. Patent No. 2,533,142, according to which latter the shaft comprises an upper part A communicating with a lower part B, the two parts being so designed and positioned with respect to each other as to provide a passageway therebetween and, as represented at 23 and 24 respectively, lower and upper, annular, plenum spaces immediately adjacent and contiguous with free surfaces of the charge column at the upper end of lower part B and adjacent the lower end of upper part A, respectively. Offset from parts A and B is a chamber 25 providing combustion space D, which communicates with parts A and B at plenum spaces 24 and 23 respectively. In the lower part B of the furnace there is provided an inlet conduit 26 for a forced current of air supplied by pump 27 to be passed upwardly through the material in part B to plenum space 23, thence into and through combustion space D, and finally to plenum space 24 and into and through the material in part A. At 28 is represented a fuel inlet for delivering fluid fuel to the combustion space D for combustion in the air current whereby to thermally enrich the latter prior to its passage through part A.

The pellets of fluent material undergo an indurating process as they descend progressively through the furnace and are finally discharged at the bottom of the furnace by means of a discharge mechanism which, in the form illustrated, is comprised of an endless belt conveyor 30 driven by an electric motor 31.

It has been explained that the principal objective sought by the present invention is the substantially complete elimination of all "hills" and "valleys" in the profile of the stockline of the charge column in the furnace. To this end, reference is now made in particular to Figs. 2 and 3. A feeler cup 32, for sensing, i.e. determining the stockline profile is mounted at the outer end of an arm 33 whose inner end is made fast to a rocker shaft 34. Rocker shaft 34 is mounted for rotation in a bracket 35 secured to the carriage 2. Feeler cup 32 rides by gravity upon the surface of the stockline 15 and is located either slightly in advance of or substantially beneath the leading side 7a of the tapered discharge chute 7 as viewed in Fig. 2. That is, with rotation of the carriage 2 counterclockwise as indicated in Fig. 2 by the directional arrow, cup 32 occupies a position counterclockwise from the leading side 7a of chute 7 and is used to determine the stockline profile slightly in advance of, or beneath, the feeder chutes.

Figure 3:
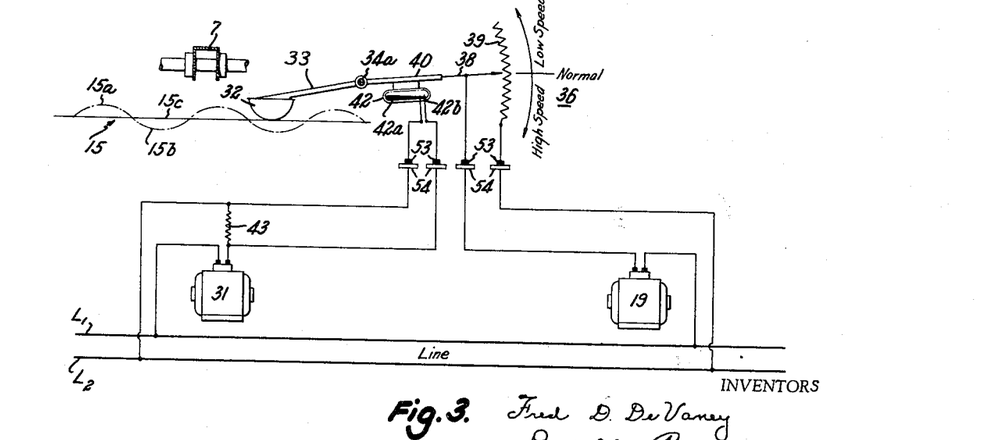
Fig. 3 is a schematic electrical diagram appertaining to the automatic control for the carriage drive motor and furnace discharge motor according to the embodiment of the invention as illustrated in Figs. 1 and 2.

As the feeler cup 32 rides in a circular path over the stockline 15, part of which is shown in development in Fig. 3, it rises and falls according to the hills 15a and valleys 15b in the stockline which represent in a somewhat exaggerated manner the undesirable deviations in the stockline profile from the uniformly even level indicated by the line 15c. The circuit of motor 19 which drives carriage 2 includes a rheostat 36 connected in series therewith from the power line conductors $L_1$ and $L_2$ and mounted within a housing 37 also carried by bracket 35. The position of the rheostat slider 38 on the resistor element 39 at any instant is governed by the instant elevation of feeler cup 32, and the arrangement is such that the portion of resistor 39 in circuit with carriage drive motor 19 increases from normal as feeler cup 32 drops in a "valley" 15b in the stockline and decreases from normal as the cup rises over a "hill" 15a in the stockline. To this end slider 38 can be mounted as shown upon an arm 40 secured to rock shaft 34 such that as arm 33 rises, arm 40 will be lowered, and vice versa. An increase in resistance from the normal setting is effective to slow down the carriage motor drive from its normal rate of about one revolution per minute and hence the immediate result is to deposit the fluent material at a greater than normal rate, per unit of travel, upon this valleyed portion of the stockline. In a similar manner, a decrease in resistance signalled by a rise in cup 32 upon a hill is effective to speed up the carriage drive motor 19 with the result that the fluent material deposited upon the hilled portion will be at a less-than-normal rate. Thus, by slowing down the rate of rotation of the carriage 2 and thereby also the chutes 6 and 7 at any temporary "valley" in the stockline detected by feeler 32, and, conversely, increasing the rate of rotation at any temporary "hill" detected by feeler 32, the general result will be to maintain the stockline at the same level throughout the entire rotational path of the feeder chutes. The control is progressive in character in that the change in speed of the carriage drive motor 19 is proportional to the rise or fall of the feeler cup 32 on the stockline 15.

It will also be observed from Fig. 3 that a mercury type of switch 42 may be included in the control circuit of the motor 31 which drives the discharge conveyor 30 for switching in or out of the motor circuit a control resistor 43 connected in series between the power line, $L_1L_2$ and motor 31. With resistor 43 shunted out of the circuit of motor 31 by closure of the contacts in switch 42, motor 31 will receive a higher operating voltage, the effect of which is to cause it to run faster and hence increase the speed of the discharge conveyor belt 30 which in turn effects a corresponding increase in the rate at which the heat-treated fluent material is discharged from the furnace.

Conversely, with resistor 43 connected in the circuit of motor 31 which is the condition which obtains when the contacts of switch 42 are open, the operating voltage for the motor is decreased, causing it, and hence also the conveyor belt 30, to decrease in speed and hence effect a decrease in the discharge rate of the fluent material from the furnace. With the rheostat arm 38 at the "normal" position on resistance 39 as pictured in Fig. 3, the contacts of switch 42 can be closed or open.

Switch 42 is also conveniently located within housing 37 and can also be secured to arm 40 on the opposite side of the rock shaft pivot axis 34a from feeler cup 32. As illustrated, the arrangement is such that when the feeler cup 32 rides the stockline at the normal level 15c sought to be maintained, or is above such level, switch 42 will be tipped to such an angle that the mercury 42a therein bridges and closes the circuit at the switch contacts 42b thus shunting out resistor 43 and causing discharge conveyor 30 to operate at its "fast" rate and withdraw fluent material from the furnace at a greater rate than it is being brought to the furnace by conveyor 14. The effect of this will be to slightly lower the general level of the stockline 15. Then when the general level of the stockline has decreased to a point below the normal average, switch 42 is tipped upward to a position wherein the mercury 42a will no longer bridge and close the circuit across the switch contacts 42b. Control resistor 43 is thereby reconnected in the circuit of motor 31 and the latter will run at its "slow" rate to thereby effect withdrawal of the material from the furnace at a lesser rate than it is being brought to the furnace by conveyor 14. The effect of this will be to raise the average level of the stockline 15 back to at least normal, whereupon the control cycle will be repeated. Thus by the "hunting" type of control wherein the discharge rate of the material from the furnace is cyclically increased and decreased, a generally average elevation of the stockline will be maintained in the furnace. A somewhat similar type of control for maintaining the average elevation of the stockline is disclosed and claimed in U.S. Patent No. 2,646,900.

From the foregoing description it should now be clearly apparent that the two motor controls shown in Fig. 3 operate in conjunction with each other, the control for motor 31 serving to maintain an average elevation of the stockline 15, and the control for motor 19 serving to remove any "hills" and "valleys" from the profile of the stockline regardless of its instant average height.

Figure 4:
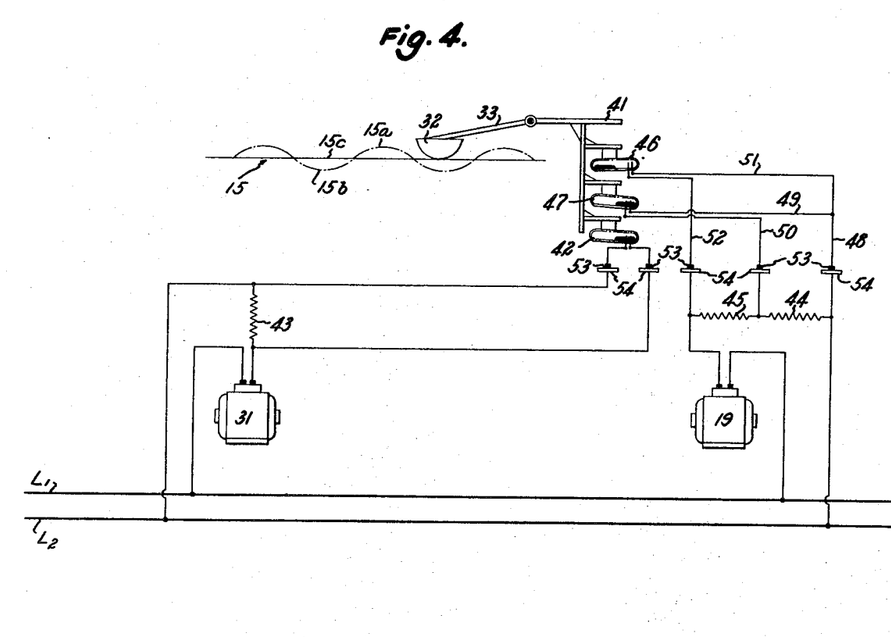
Fig. 4 is also a schematic electrical diagram for a somewhat modified embodiment of the invention.

A modified type of control over the speed of the carriage drive motor is illustrated in Fig. 4 wherein means are provided for running motor 19 at three speeds, "high," "normal" and "low," as distinguished from the rheostat control of Fig. 3 wherein the speed of motor 19 is varied more directly proportionally to the size of the "hills" and "valleys" in the stockline profile.

With reference now to Fig. 4, wherein elements which are the same as in Fig. 3 have been assigned the same reference numbers, it will be seen that the circuit from motor 19 to the line conductors $L_1L_2$ includes two resistors 44, 45 connected in series therewith, and that control over these resistors which are arranged to be selectively shunted out of the motor circuit is exercised by two mercury switches 46, 47 mounted on arm 41, the resistors 44, 45 and their shunting switches 46, 47 taking the place of the rheostat 36 in the Fig. 2 control. Also mounted on arm 41 is another mercury switch 42 which functions to control the speed of the material discharge device in the same manner as in the Fig. 3 arrangement. Mercury switches 46 and 47 are so adjusted on their supports that the contacts of both will be open whenever the feeler cup 32 detects a low spot or "valley" 15b in the stockline profile. Under these conditions both resistors 44, 45 remain in series circuit relation with the carriage drive motor 19 causing the carriage and material loader to rotate at the "low" speed. When feeler cup 32 rides the stockline at the normal profile as depicted in Fig. 4, switch 46 will remain open but switch 47 will be closed, thus shunting out resistor 44 through conductors 48, 49 and 50 and causing the carriage drive motor 19 to operate at its middle or "normal" speed. When feeler cup 32 detects a "hill" 15a in the profile of the stockline as measured along its circular path around the stockline, mercury switch 46 will also close which is effective to shunt out both resistors 44, 45 through conductors 48, 51 and 52, whereupon carriage drive motor 19 is caused to run at its "high" speed.

Control over the speed of the material discharge as explained above is effected through mercury switch 42 which operates in the same manner as in the Fig. 3 circuit and preferably the mercury switches 42 and 47 are so adjusted that their contacts close at the same time.

Thus, as long as carriage 2 travels at the "normal" speed the feeder chute 7 will deposit on the stockline 15 a material layer of normal (and uniform) thickness, whereas the chute 7 will deposit a thinner than normal layer when the carriage is traveling at the "high" speed, and a thicker than normal layer when the carriage is traveling at the "low" speed. Hence, as long as stockline feeler 32 feels a stockline surface whose levelness is within the limits of "normal" range, the carriage 2 travels at normal rate causing feeder chute 7 to lay down a pellet layer of normal, uniform thickness. When, however, feeler 32 encounters a stockline surface portion whose height is greater than "normal" (i.e., hits a high spot in the profile of the stockline), the rate of angular movement of the carriage 2 is increased to "high" speed and feeder chute 7 is caused to deposit a thinner than normal layer of pellets. As soon as feeler 32 passes over the high spot and encounters a stockline surface portion whose height is within the normal range, the rate of movement of carriage 2 is decreased to normal speed, whereupon feed chute 7 is caused to deposit a pellet layer of normal thickness. When feeler 32 encounters a stockline surface portion whose height is less than normal (i.e., hits a low spot in the stockline profile), the rate of movement of carriage 2 is decreased from "normal" speed to "low" speed and feeder chute 7 is caused to deposit a thicker than normal layer of pellets on stockline 15 for so long as feeler 32 continues to signal the presence of the low spot, thus tending to correct the low spot, whereafter the rate of movement of carriage 2 is advanced to "normal" speed and feeder chute 7 of the loader is caused to deposit a pellet layer of normal thickness.

By thus controlling and varying the speed of travel of the loader carriage 2, the relative thickness of the pellet layer laid down on the stockline 15 is made self-compensating to the end that "hills" and "valleys" will be eliminated from the stockline profile practically as fast as they start to appear.

Conventional slip rings and brushes are utilized for connecting switch 42 and rheostat 36 according to the Fig. 3 arrangement or the switches 42, 46 and 47 according to the Fig. 4 arrangement into their respective control circuits for the loader carriage drive motor 19 and the material discharge drive motor 31; the brushes 53 are carried by and rotate with the carriage 2, and the slip rings 54 on which the brushes ride are arranged one above the other and are secured about the periphery of the furnace 1.

Feeler cup 32 may, with little or no decrease in the accuracy of the control, be located directly at the point of deposit of the fluent material instead of somewhat ahead of said point. Where one is not concerned with minute imperfections in the regularity of the stockline profile but rather with imperfections large enough to affect, say 2 or 3 square feet of the stockline, feeler cup 32 may measure a few inches behind the loader—which itself covers some area—and still adequately correct the involved 2 or 3 square feet of stockline area.

Following is a specific description of an organization, embodying principles of this invention, adapted for use in connection with a generally vertical shaft furnace of rectangular cross-section, as illustrated in Figs. 5–12 inclusive. The furnace loader per se of this organization is identical with that disclosed and claimed in our copending application Serial No. 437,948, filed June 21, 1954, entitled "Apparatus for Charging Furnace having Rectangular Mouth," except for the integration thereinto of stockline controls according to the present invention.

Figure 7:
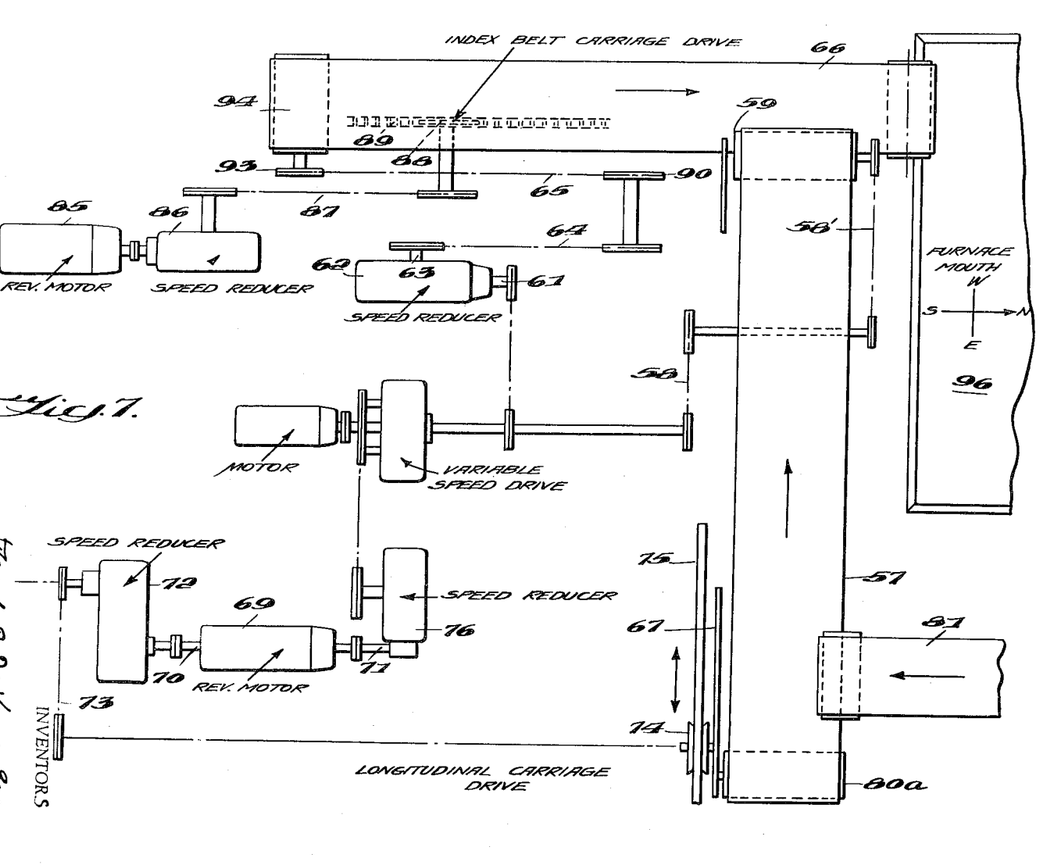
Figure 7 is a diagrammatic view of the furnace charging apparatus illustrated in Figs. 5 and 6, showing the longitudinal and index belts, their directions of movement, and the drive motors and other operating components which drive the belts and their respective carriages in the interrelated manner necessary to charge "raw" pellets to the furnace mouth.

With reference to Figures 5 to 12 inclusive, and in particular to Fig. 7 which presents the principal operating components of this organization in diagrammatic form, item 51 is a conventional 3-phase alternating current motor the shaft of which is coupled via a 2:1 reduction belt drive 52 to the input shaft 53 of a planetary type variable speed drive 54, of conventional construction, having a rotatable housing 55 which serves to change the ratio between the speed of its input shaft 53 and its output shaft 56. Shaft 56 serves to drive the first, or "longitudinal" conveyor belt 57 through chain and sprocket assemblies 58—58' which lead to the forward pulley 59 for said belt. Output shaft 56 also is coupled, through a chain and sprocket drive 60, to the input shaft 61 of a speed reducing unit 62. The output shaft 63 of this latter is connected through chain and sprocket assemblies 64, 65 in driving relation with the index conveyor belt 66. Thus, motor 51 furnishes power for driving the so-called "first" belt 57 on the "first" or longitudinal carriage 67 and the "second" or index belt 66 on the "second" or index carriage 68, the motor 51 being mounted upon carriage 67.

Carriage 67 is reciprocated longitudinally of itself by means of a reversible, direct current motor 69, also mounted on carriage 67, having output shafts 70, 71 extending from opposite ends thereof. Output shaft 70 drives the input to the speed reducer 72 and the output of this reducer is coupled, via chain and sprocket drive assembly 73, to drive one of the wheels 74 on carriage 67, the wheels 74 being arranged to run on rails 75 secured to the supporting frame or floor structure 78.

This carriage 67 is constituted by a forward truck component 67a which carries the various motors and other drive components above described, as well as the index belt 66 and index carriage 68; also, the forward or discharge end of the longitudinal belt 57. Belt 57 is supported by a structure which includes a pair of parallel, spaced, structural channel beams 79 extending longitudinally and rearwardly from the forward truck 67a to a single axled trailer truck 67b having wheels 74 running on rails 75. Truck 67b carries the pulley structure for the rear end of belt 57; the same includes an L-shaped member 80 pivotally mounted on truck 67b, a pulley 80a rotatably mounted on the upwardly extending vertical leg of member 80 and a counterweight 80b depending from the rearwardly extending horizontal leg of the L-shaped member. The purpose of the pivotal support 80 for rear pulley 80a for belt 57 and counterweight 80b is to maintain a suitable tension on the belt.

Figure 5:
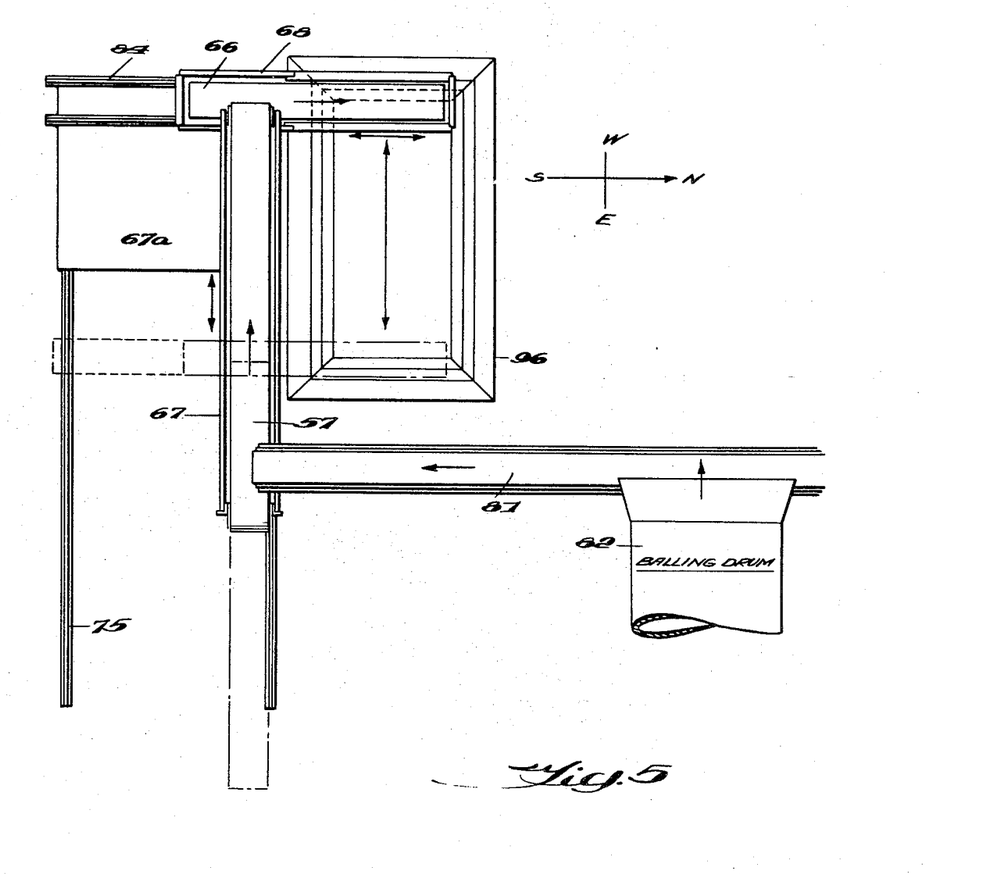
Fig. 5 is a plan view showing the general layout of a different apparatus for conveying pellets from a balling drum to the mouth of a shaft-type indurating furnace of rectangular cross-section.

The opposite output shaft 71 of motor 69 is connected to drive the input of another speed reduction mechanism 76 mounted on truck 67a and the output of reducer 76 is connected via another chain and sprocket assembly 77 to the rotatable planetary housing 55 of variable speed drive 54. Thus, when motor 69 runs to thus drive the longitudinal carriage 67, it also rotates the planetary housing 55 thereby to cause a corresponding change in the speed of output shaft 56. Such an arrangement is essential to maintenance of a constant depth of loading on the main belt with respect to its point of loading by the discharge from the transfer belt 81. Fig. 5 shows the structural detail of the related components, the belt 81 serving to transfer pellets from the balling drum 82 to belt 57. That is to say, longitudinal belt 57 must always move past the transfer belt 81 at a constant rate (e.g., at 90 feet per minute) regardless of the direction in which carriage 67 is traveling. This, in principle, is accomplished by superimposing the actual linear speed of carriage 67, in reverse, upon the linear speed of belt 57.

When reversible motor 69 is rotating in such direction as to drive carriage 67 from east to west at a rate of 30 feet per minute, the speed of belt 57 must be slowed down from its normal absolute speed of 90 feet per minute to a lower speed of 60 feet per minute with respect to carriage 67. This result is obtained automatically through rotation of housing 55 of the variable speed drive in such direction as will reduce the speed of shaft 56 that drives belt 57.

In a similar manner, when motor 69 reverses and carriage 67 thus travels from west to east, at the rate of 30 feet per minute, the speed of belt 57 must be increased from its normal absolute speed of 90 feet per minute to a higher speed of 120 feet per minute with respect to carriage 67. This result is also obtained automatically because, with a reversed direction of rotation of motor 69, housing 55 of the variable speed drive 55 also rotates in the opposite direction to thereby increase the speed of shaft 56 driving the belt 57.

When carriage 67 reaches the east and west extremes of its path of longitudinal movement, motor 69 is stopped by means of limit switches (to be later described). This of course also stops rotation of housing 55 of the variable speed drive 54 so that shaft 56 will rotate at its "normal" speed to drive belt 57 at its "normal" linear speed of 90 feet per minute.

The index carriage 68 is mounted on wheels 83 which run on a set of rails 84 arranged on the longitudinal carriage 67 at right angles to the rails 75 on which carriage 67 runs. To reciprocate the index carriage 68, a reversible motor 85 is used. Motor 85 drives through a speed reduction unit 86 and a chain and sprocket assembly 87 to a pinion gear 88 which meshes with a gear rack 89 secured longitudinally of the carriage 68 at the lower side thereof. Motor 85 is likewise controlled by limit switches (to be later explained) in such manner that it runs to shift carriage 68 and hence shift belt 66 from south to north, or vice versa, when the longitudinal carriage 67 is stopped; motor 85 stops to thus stop carriage 68 when the longitudinal carriage 67 is being shifted from east to west or vice versa.

Motors 5, 69, and 85, speed reducers 62, 72, 76 and 86, and the variable speed drive 55 are all mounted on the longitudinal carriage 67. Since the motor furnishing the driving power for the index belt 66 is mounted on carriage 67, a special "wrap-around" arrangement is required in the driving chain and sprocket assembly 65 to compensate for the indexing of the belt 66. This "wrap around" arrangement, shown most clearly in Fig. 8, includes a sprocket 90 rotatably mounted on carriage 67 and driven by the chain and sprocket drive 64. Sprockets 91 and 92 are idler sprockets also mounted on carriage 67. Another sprocket 93 is rotatably mounted on the index belt drive pulley shaft 94 and serves to transmit power from the chain 65 to the index belt 66. Sprocket 95 is an idler mounted on the index belt carriage 68. Thus sprockets 90, 91 and 92 are rotatably mounted on the longitudinal carriage 67 and sprockets 93, 94 are mounted on, and thus move with, the index carriage 68.

Figure 8:
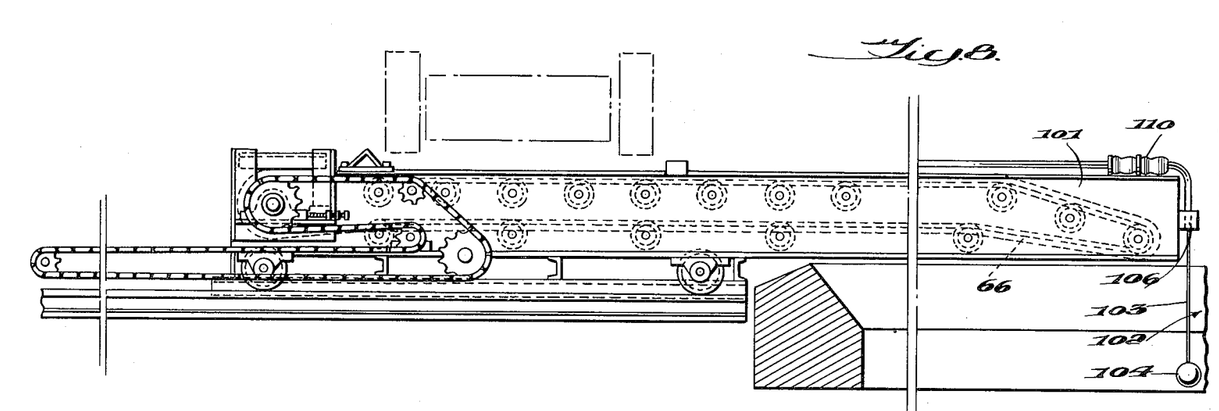
Fig. 8 is a side elevational view of the index carriage, as extended to adjacent the far, or "north," wall of the furnace mouth, showing the provision thereto of profile-determining and speed-varying-means in accordance with the present invention.

With this arrangement, when the carriage 68 and belt 66 indexes "south," that section of the chain 65 designated X becomes longer by the same amount that section Y thereof becomes shorter. All other sections of the chain 65 remain the same in length. Thus the drive for the index belt 66 will operate satisfactorily regardless of the position of index carriage 68 with respect to carriage 67. Sprockets 90 and 91 being mounted on carriage 67, their peripheral speed is not influenced by any motion of the index carriage 68. This being so, the section of chain 65 between sprockets 91 and 93 will run at a linear speed which is not influenced by any motion of the indexing carriage 68. Since sprocket 93 is fixed upon the drive shaft 94 of index belt 66, the linear speed of the latter is fixed with respect to the linear speed of the section of chain 65 between sprockets 91 and 93. Thus, the speed of index belt 66 with respect to carriage 67 is not affected by any motion of the indexing carriage 68.

In accordance with the present invention, the "raw" pellets are continuously supplied, from a fixed locus of supply, e.g., from a non-reciprocatable feeder belt 81 communicating with a balling drum 82, to a first conveyor belt 57 which is disposed parallel to one side of the furnace mouth and which is reciprocatable longitudinally of said side by means of carriage 67. The first conveyor belt 57 delivers the pellets to a reciprocatable second conveyor belt 66 which is disposed beneath the discharge end of the first conveyor belt 57 and at a right angle to and transversely reciprocatable with respect to the latter by means of an index carriage 68, the discharge end of the second conveyor belt 66 extending over the mouth 96 of the indurating furnace so that pellets received on the second conveyor belt (from said first belt) are delivered onto the top surface or stockline of a charge column of similar pellets occupying the furnace. The pellets are laid down in a layer (as distinguished from being dumped into a pile) onto the stockline of the charge column by appropriate reciprocations of the first and second belts, as a unit, longitudinally of said side of the mouth interspersed with appropriate transverse reciprocations of said second belt with respect to said first belt, whereby the discharge end of the second belt is moved in longitudinal and transverse paths over the mouth of the furnace and is thus able to reach any part of the furnace mouth.

It is important that the deposit of pellets onto the stockline be such as will maintain the column of pellets in the furnace at a uniform height throughout the area of the column, i.e. throughout the area of the furnace mouth 96. Since the latter is rectangular, the desired result may be achieved by rectilinear movement of the discharge end of the index belt 66 extending parallel with the side and end walls of the furnace mouth.

One pattern of pellet deposit found satisfactory can be called a "two path" cycle, in which the discharge end of the index belt 66 describes a rectangular path in a clockwise direction. Assuming for purposes of illustration the cycle to begin at the northwest corner of the furnace mouth, the feeder first moves east to the northeast corner of the furnace mouth 96, thence the feeder moves south to the southeast corner of the furnace mouth; then, the feeder moves west to the southwest corner of the furnace mouth; and finally the feeder moves north to the northwest corner of the furnace mouth, i.e. to the starting point; the cycle then repeats.

For this arrangement, four limit switches are employed, these being indicated by letter groups NLS, ELS, SLS and WLS. As shown in the condensed circuit diagram of Fig. 10, each of these limit switches functions, when closed, to energize a control relay. As indicated in the diagram, limit switch NLS controls relay CR1, limit switch ELS controls relay CR2, limit switch SLS controls relay CR3, and limit switch WLS controls relay CR4.

With the feeder at the northwest corner of the furnace mouth 96, the arrangement is such that limit switches WLS and NLS are closed and limit switches ELS and SLS are open. With limit switch NLS closed, relay CR1 becomes energized to whereby close its front contacts CR1–1 in the energizing circuit of the east run relay CR5. Limit switch ELS being open, control relay CR2 remains unenergized and its back contacts CR2–1 are closed. Thus the east run motor control relay CR5 is energized and closes its front contacts CR5–1 and CR5–2 shown in the armature circuit of the east-west run motor 69 in Fig. 11. Current now passes through the armature 69a of motor 69 from the direct current power supply line in the direction indicated by the solid arrows, and the armature of motor 69 begins to run in such direction as will cause the longitudinal carriage 67 to move in the eastward direction. Motion in no other direction is possible because limit switches ELS and SLS are open. Hence, control relay CR2 remains unenergized and thereby also the south run relay CR6, since the contacts of relay CR2 are in the energizing circuit of relay CR6. Although limit switch WLS is closed and hence relay CR4 is energized, in which condition its front contacts CR4–1 are closed, the front contacts CR3–2 of relay CR3 are open since the latter is unenergized because limit switch SLS is open. Consequently, the west run relay CR7 remains unenergized. Limit switch NLS is closed thus energizing relay CR1, which opens the back contacts CR1–2 of the latter in the energizing circuit of the north run relay CR8 and hence the latter remains unenergized.

As carriage 67 begins its eastward run, limit switch WLS opens, and when the carriage reaches the end of its eastward travel, limit switch ELS closes and thereby energizes relay CR2. Back contacts CR2–1 of relay CR2 are thereby caused to open and thus open the circuit to relay CR5, opening its contacts CR5–1 and CR5–2 and causing motor 69 and hence carriage 68 to stop. At the same time, the energizing circuit to the south run relay CR6 will close as front contacts CR2–2 of relay CR2 close, and back contacts CR3–1 of relay CR3 are already closed because relay CR3 is unenergized. Energization of relay CR6 effects closure of its contacts CR6–1 and CR6–2 in the armature circuit 85a of the north-south run motor 85 in Fig. 11. Current now passes through the armature 85a of motor 85 from the direct current power supply line in the direction indicated by the solid arrows, and the armature of motor 85 begins to run in such direction as will cause the indexing carriage 68 to index in the southward direction.

As index carriage 68 begins its southward run, limit switch NLS opens and when it reaches the end of that run, limit switch SLS closes to thus energize relay CR3 and open the back contacts CR3–1 of the latter thereupon causing relay CR6 to become deenergized and opening its contacts CR6–1 and CR6–2 and stopping motor 85. At the same time, the energizing circuit to the west run relay CR7 will be completed through the then closed front contacts CR3–2 of relay CR3 and back contacts CR4–1 which are also closed since the west limit switch WLS is at such time unenergized, thus closing contacts CR7–1 and CR7–2 of relay CR7 in the armature circuit of the east-west run motor 69. Current then flows through motor armature 69a in the direction indicated by the broken arrows, and armature 69a will run in such direction as will cause the longitudinal carriage 67 to move in the westward direction. Limit switch ELS then opens.

As carriage 67 reaches the end of its westward travel, limit switch WLS closes thereby energizing relay CR4 and causing the back contacts CR4–1 of the latter to open and thereby open the circuit to motor control relay CR7. The contacts CR7–1 and CR7–2 of the latter open and thus cause motor 69 to stop. At the same time the energizing circuit to the north run relay CR8 will be completed through front contacts CR4–2 of relay CR4 now closed and the closed back contacts CR1–2 of unenergized relay CR1. Energization of relay CR8 effects closure of its contacts CR8–1 and CR8–2 in the armature circuit of the north-south run motor 85. Current now passes through the armature 85a of motor 85 from the direct current power supply line in the direction indicated by the broken arrows, and the armature of motor 85 begins to run in such direction as will cause the indexing carriage 68 to index in the northward direction. Limit switch SLS now opens.

As index carriage 68 reaches the end of its northward travel, limit switch NLS is closed to thus energize relay CR1 and open the back contacts CR1–2 of the latter thereupon causing relay CR8 to become deenergized and opening its contacts CR8–1 and CR8–2 to thereby stop motor 85. This completes the "two path" cycle (path 1 to the east and path 2 to the west) for the feeder coupled with indexing of the feeder in the north-south directions at the ends of the east and west paths and the cycle then repeats itself.

In the event the cycle is stopped for any reason such as a power failure, the feeder will re-start in the same direction it was traveling, if it stopped with only one limit switch in the closed position, as for example in the middle of path 1 (to the east). In such event, when power is again applied only limit switch NLS is energized and hence only relay CR1 will be energized which in turn will effect energization of the east run motor 69. Should the cycle be stopped at the northwest corner of the furnace mouth 96, again the feeder will move east because limit switch NLS being closed will energize relay CR1 thus opening the back contacts CR1–2 and hence opening the circuit to the north run relay CR8; and by closing front contacts CR1–1 the circuit is closed for energizing the east run relay CR5. If the feeder is stopped and then moved manually so that none of the limit switches are closed, it is only necessary to move the feeder to the limit of its movement in any one direction to start the cycle.

The limit switches ELS and WLS are preferably located on the longitudinal carriage 67 and are arranged to be actuated respectively by cams (not shown) on the main frame as the carriage reaches the east and west ends of its travel. Limit switches NLS and SLS may be located on carriage 67 at opposite ends of the north-south travel of the index carriage 68 so as to be also actuated by other cams (not shown) on the latter as the carriage reaches the opposite ends of its travel.

The following tables of longitudinal and index carriage speeds, absolute and relative speeds of the longitudinal and index conveyor belts, times of travel and units of material deposited have been found satisfactory for application to a furnace, the mouth 96 of which measures 6 feet in the north-south direction and 14 feet in the east-west direction.

The feeder path 97, i.e. the line of discharge of the pellets from the index belt 66, in such case is located one foot from the east and west walls and six inches from the north and south walls.

A. *Motion of index carriage versus feed to furnace mouth*

|  | Speed of index carriage 68, ft./min. | Discharge speed of index belt 66, ft./min. | Time required for 5′ Travel of index carriage 68, secs. | Units of pellets deposited for travel of index carriage 68 |
| --- | --- | --- | --- | --- |
| Stationary | 0 | 30 | | |
| No. to So | 30 | 60 | 10 | 600 |
| So. to No | 10 | 20 | 30 | 600 |

As is evident from Fig. 5, index belt 66 always travels in a northward direction with respect to its carriage 68 and hence in order to deposit about the same number of units of pellets onto the stockline for the northward as well as the southward travel of index carriage 68, it is necessary to move carriage 68 at a higher speed when movement of the carriage is southward than when movement of the carriage is northward. This can be achieved through use of appropriately sized resistors 98 in the two armature circuits of motor 85.

With the discharge point of the index belt located one foot from the east and west walls of the furnace mouth, the index belt will distribute the pellets over a two foot wide path and which path is five feet in length. The area of the furnace mouth supplied will thus be ten square feet. The rate of pellet feed will thus be $$\frac{600}{10}$$

or 60 units per square foot of stockline.

B. *Motion of longitudinal carriage versus feed to furnace*

|  | Speed of Long. Carriage 67 | Discharge Speed of Long. Belt 57, ft./min. | Discharge Speed of Index Belt 66, ft./min. | Time required for 12′ Travel of Long. Carr. 67 | Units of pellets deposited for travel of Long. Carr. 67 |
|---|---|---|---|---|---|
| Stationary | 0 | 90 | 30 | | |
| West to East | 11 | 101 | 33.6 | 65 | [1] 2,200 |
| East to West | 9 | 81 | 27 | 80 | [1] 2,160 |

[1] These are approximately the same.

As is also evident from Fig. 5, the longitudinal carriage belt 57 always travels in a westward direction with respect to its carriage 67 and hence in order to deposit about the same number of units or pellets onto the stockline for the westward as well as the eastward travel of carriage 67, it is necessary to move carriage 67 at a higher speed when its movement is eastward than when movement of the carriage is westward. This can be achieved through use of appropriately sized resistors 99 in the two armature circuits of motor 69.

When making an east or west pass, the discharge from the index belt 66 must feed three feet of width, i.e. half the width of the furnace. With twelve feet of travel, the area fed per pass is thirty-six square feet. The rate of pellet feed for an east or west pass will thus be approximately $$\frac{2200}{36}$$

or 61 units per square foot of stockline which is just about the same as the 60 unit feed rate for a north or south index. Thus the rate of deposit of pellets will be approximately uniform for the complete path of travel of the feeder around the stockline in the furnace. The total time required for the feeder to complete one cycle is 185 seconds, or about 3 minutes.

While the feeder control which has been described assures a substantially uniform rate of deposit of pellets onto the stockline, the latter may not always be uniform in height throughout its area. Low or high spots—sometimes caused by non-uniform descent of the column—may appear, and hence it is desirable to modify the rate of travel of the feeder, over the top of the column, in an automatic manner so as to slow it down when over a low spot and speed it up when over a high spot. The desired result is obtained through use of the principles disclosed and claimed herein.

According to the embodiment about to be described, the basis for automatic control is a sensing device which is suspended from the outer end of the indexing belt frame, which sensing device includes an electrically insulated cable suspended from the indexing belt frame in such a manner that the cable will touch the top of the charge column when the latter is at the predetermined "correct" level and at levels higher than the predetermined. The sensing cable is electrically connected to an electronic relay of the resistance sensitive type. When the cable is in contact with the stockline, the electronic relay is actuated, and the latter in turn actuates an auxiliary relay (or relays, as the case may be). The auxiliary relay then performs three operations:

The first is to correlate the discharge rate by placing the discharge device on high or low discharge rate as called for by the sensing cable, e.g. when the sensing cable is in contact with the top of the bed, the bed condition is "high" and the discharge device operates at high speed.

The second function is to control the rate of travel of the feeder mechanism through the same sensing probe and relays as those which control the discharge rate. As explained above, the tons of raw pellets discharged per hour are not varied by the control apparatus but rather the distributive rate of travel over each square foot of the bed surface is varied by changing the speed at which the feeder mechanism passes over the surface. When the sensing device ("probe") touches the bed at a high spot the rate of travel of the feeder apparatus is increased so that a thinner layer of pellets is laid on the bed surface at the high spot. When, on the other hand, the probe loses contact with the bed surface at a low spot in the latter, the rate of travel of the feeder apparatus is decreased and a thicker layer of pellets is laid down at such low spot. These speed changes occur at the same time, and in the same way, as the changes in speed of the device which discharges indurated and cooled pellets from the bottom of the charge column.

The third function of the sensing device is to give a visual indication of variations in rate of travel of the feeder apparatus through indicating lights on a control panel, actuation of such visual indicators being effected through the same relays which control the feeder machine speeds.

The technical operation is as follows: When the electronic relay is not grounded through the sensing probe, its contact remains open and the auxiliary relay remains inoperative. Through normally closed contacts on the auxiliary relay, the feeder machine and the discharge device are maintained at their low speed rates. When the sensing probe touches the top of the bed a grounded circuit is established which deenergizes the electronic relay. The electronic relay contact closes and energizes the auxiliary relay, thus placing the feeding machine and the discharge device on high speed. Momentary operation of the relays from bouncing of the sensing probe is avoided by using an R-C circuit in the ground leg of the electronic relay, which R-C circuit causes a two-second delay in the operation of the relays and thereby produces a relatively stable operation of the control.

Figure 9:
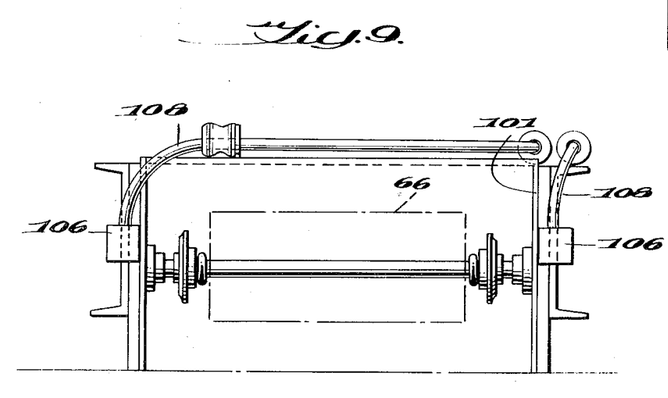
Fig. 9 is an end view of the index carriage.
Figure 10:
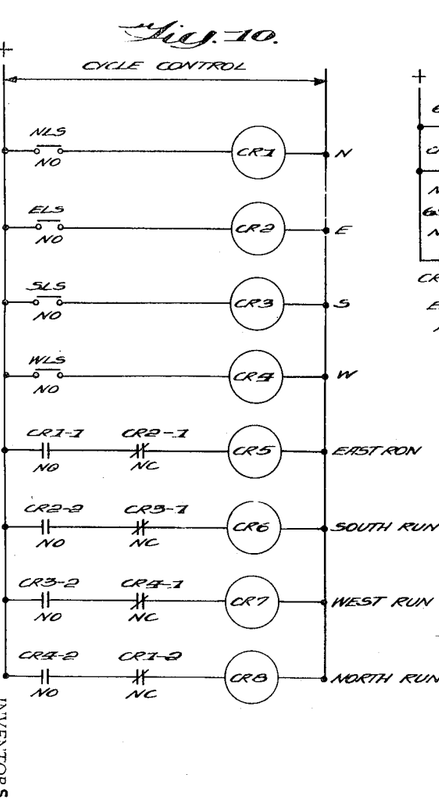
Fig. 10 is a condensed circuit diagram showing an electrical control arrangement producing a "two pass" pattern of pellets discharge onto the stockline of a pellets column occupying the furnace.

As shown in Figs. 8 and 9 from either side of the forward end of the supporting frame 101 of index belt 66 there depend sensing probes 102, 102 one of which includes a flexible electrically conductive cable 103 to the lower end of which is welded (or otherwise secured) an electrically conductive metal ball 104. Cable 103 is insulated from frame 101 by means of an insulating sleeve 106 which is secured to the end of frame 101 and, anteriorally, by means of a heavy duty insulated conduit 108 which is fixed to frame 101 by means of insulated support members 110 and leads to a control system now to be described, with particular reference to Fig. 11. At 111 is schematically shown an electronic relay, of the resistance sensitive type, having one leg grounded through an R–C circuit 112 and another leg connected to ground through flexible conductor 103 when ball 104 contacts the pellets bed 113 occupying the indurating furnace. The electronic relay in turn controls the operation of an auxiliary relay 115, which latter controls the low speed or high speed operation of the drive motors.

Figure 11:
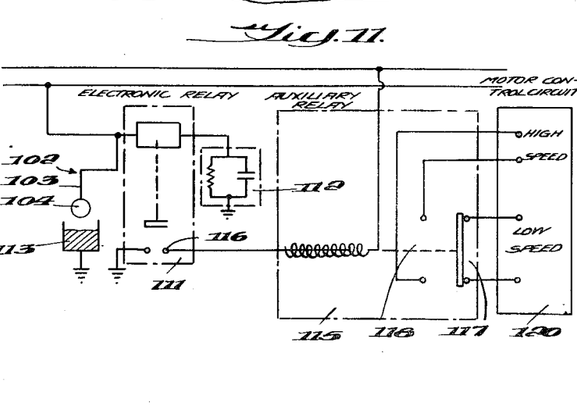
Fig. 11 is a circuit diagram for the drive motors for the longitudinal and index carriages, which diagram is related to the Fig. 10 circuit.

The operation of this circuitry may now be readily described. When the electronic relay 111 is not grounded through the sensing probe 102, its contacts—shown schematically as 116—remain open and the auxiliary relay 115 remains inoperative. Through normally closed contacts 117 on the auxiliary relay the charging machine and the discharge device are kept at their low speed rates. When the sensing ball 104 touches the bed 113 a grounded circuit is established which deenergizes the electronic relay 111. The electronic relay contacts 116 are closed, energizing the auxiliary relay 117 to close contacts 118 and hence to place the motor control circuit on high speed operation. Momentary operation of the relays, from bouncing of the sensing ball 104, is avoided by the insertion of the aforementioned R-C circuit 112 in the ground leg of the electronic relay 111. This latter circuit causes a 2-second delay in the operation of the relays and hence produces a relatively stable operation of motor control circuit 120.

Figure 12:
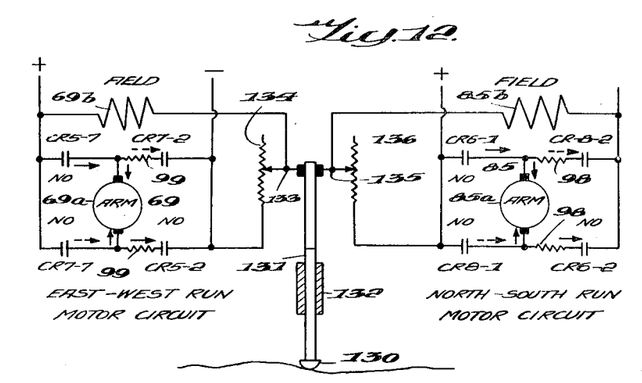
Fig. 12 is a circuit diagram similar to that illustrated in Fig. 11 but showing the provision of a different profile-determining and speed-varying means in accordance with this invention.
Figure 16:
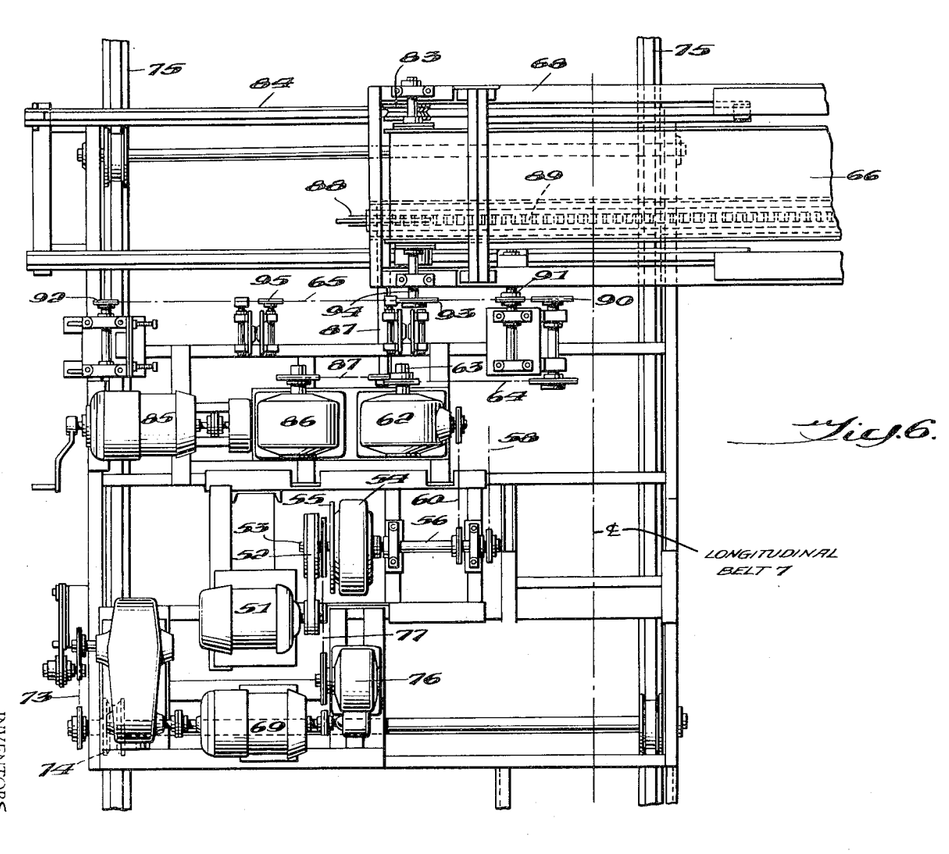

In lieu of the control organization just described, high and low spots may be sensed, and thereupon compensated for, by the employment of the following organization which is illustrated in Fig. 12. According to this latter, a feeler element 130 at the lower end of a rod 131 slidably mounted in a guide 132 secured to the main frame 101 of the feeder. Feeler element 130 rides in surface contact with the stockline, feeling out the high and low spots and travels along a path around the stockline substantially identical with that of the feeder itself. Rod 131 has attached thereto and insulated therefrom an adjustable contact 133 which slides along a variable resistor 134 connected in series with the field winding 69b of motor 69. In a similar manner, another adjustable contact 135 secured to and insulated from rod 131 is arranged to slide along a variable resistor 136 connected in series with the field winding 85b of motor 85.

Any high spots encountered by the feeler 130 will cause the rod 131 to raise and move contacts 133 and 135 along their respectively associated resistors 134 and 136 in such direction as to increase the in-circuit resistance of the latter two resistors thus increasing the resistance of the field circuits of motors 69 and 85 and decreasing the field current and causing whichever one of the two motors is then running to increase its speed and thereby correspondingly decrease the rate of pellet discharge from the feeder over the high area.

Conversely, any low spot encountered by the feeler 130 is effective to decrease the in-circuit resistance of resistors 134 and 136 thus decreasing the resistance of the field circuit of motors 69 and 85 and hence increasing the field current of these motors and causing the one of them that is then running to decrease its speed and thereby correspondingly increase the rate of pellet discharge from the feeder over the low area.

This application is a continuation-in-part of our copending application Serial No. 237,209, filed July 17, 1951, now issued as U.S. Patent No. 2,792,132.

We claim:

1. Apparatus for maintaining an average stockline elevation in a shaft furnace organization wherein fluent solid material is fed at the top thereof and heat-treated fluent solid material is discharged from a lower part thereof, comprising a loader for continuously distributing a layer of fluent solid material in a path over the stockline, a carriage for transporting the loader over said path, variable speed drive means for propelling the carriage along said path at variable speeds, said variable speed drive means including a motor control circuit having low speed circuit means for propelling said carriage along said path at a relatively low speed and high speed circuit means for propelling said carriage along said path at a relatively high speed, auxiliary relay means having a normal first position for operating said low speed circuit means and for disconnecting said high speed circuit means and a second position for disconnecting said low speed circuit means and for operating said high speed circuit means, and means for actuating said auxiliary relay means from said first position to said second position when the stockline level is at least as high as the desired average height comprising an electrical circuit one leg of which includes a flexible electrically-conductive probe insulated from said loader and suspended therebeneath to the desired average height of the stockline, the upper end of said probe being connected to a voltage source and the lower end of said probe being adapted to slidably engage the upper surface of the fluent solid material, said solid material being electrically connected to ground, said electrical circuit also including electronic relay means operable by said probe member upon the grounding thereof on the solid material for actuating said auxiliary relay.

2. Apparatus as defined in claim 1 wherein said electronic relay is of the resistance-sensitive type, and further wherein said electrical circuit includes a grounded time-delay leg connected in parallel with said probe leg to stabilize the operation of said electronic relay means.

References Cited in the file of this patent

UNITED STATES PATENTS

| | | |
|---|---|---|
| 2,636,606 | Dunasky et al. | Apr. 28, 1953 |
| 2,646,900 | Sisco | July 28, 1953 |
| 2,739,800 | Sisco | Mar. 27, 1956 |
| 2,792,132 | De Vaney et al. | May 14, 1957 |